US011512788B2

(12) United States Patent
Qiu et al.

(10) Patent No.: US 11,512,788 B2
(45) Date of Patent: Nov. 29, 2022

(54) THERMOSTATIC VALVE

(71) Applicant: Zhejiang Sanhua Automotive Components Co., Ltd., Zhejiang (CN)

(72) Inventors: Haoming Qiu, Zhejiang (CN); Zhiyong Liao, Zhejiang (CN); Xiaojun Qian, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 361 days.

(21) Appl. No.: 16/607,320

(22) PCT Filed: Apr. 27, 2018

(86) PCT No.: PCT/CN2018/084747
§ 371 (c)(1),
(2) Date: Oct. 22, 2019

(87) PCT Pub. No.: WO2018/201975
PCT Pub. Date: Nov. 8, 2018

(65) Prior Publication Data
US 2020/0355288 A1 Nov. 12, 2020

(30) Foreign Application Priority Data
May 4, 2017 (CN) .......................... 201720489650.6

(51) Int. Cl.
*F16K 11/22* (2006.01)
*F16K 27/00* (2006.01)
(Continued)

(52) U.S. Cl.
CPC .......... *F16K 27/003* (2013.01); *F16K 31/002* (2013.01); *F16K 11/22* (2013.01); *G05D 23/1353* (2013.01)

(58) Field of Classification Search
CPC ....... Y10T 137/87885; Y10T 137/7724; Y10T 137/7737; G05D 23/1353; F16K 27/003; F16K 31/002; F16K 11/22
See application file for complete search history.

(56) References Cited

U.S. PATENT DOCUMENTS

| 4,165,035 A | * | 8/1979 | Maltby | ................... F02D 37/02 |
| | | | | 137/625.26 |
| 5,618,024 A | * | 4/1997 | Westenberg | ............ F16K 3/207 |
| | | | | 251/159 |

(Continued)

FOREIGN PATENT DOCUMENTS

| CN | 103133740 A | 6/2013 |
| CN | 103851169 A | 6/2014 |

(Continued)

OTHER PUBLICATIONS

Extended European Search Report for European Application No. 18794629.8, dated Dec. 1, 2020.

(Continued)

*Primary Examiner* — Jessica Cahill
(74) *Attorney, Agent, or Firm* — Wolf, Greenfield & Sacks, P.C.

(57) ABSTRACT

A thermostatic valve includes a valve body formed by die casting. The valve body includes: a valve main body forming a valve cavity; a plurality of connection tube portions; and installation base portions adjacent to the connection tube portions. Each of the connection tube portions includes a straight tube section connected to the valve main body. A reinforcement member is provided between the straight tube section of the connection tube portion and the installation base portion adjacent to the connection tube portion. The valve body is formed by die casting, and respective parts of the valve body can be processed according to actual size requirements with no redundant material, thereby realizing (Continued)

a light weight of the thermostatic valve. Providing the reinforcement member satisfies a strength requirement when using die casting.

14 Claims, 4 Drawing Sheets

(51) Int. Cl.
*F16K 31/00* (2006.01)
*G05D 23/13* (2006.01)

(56) References Cited

U.S. PATENT DOCUMENTS

| | | | |
|---|---|---|---|
| 8,505,576 B2* | 8/2013 | Renninger | F16K 27/0263 137/597 |
| 9,945,623 B2* | 4/2018 | Sheppard | F28D 9/005 |
| 10,087,793 B2* | 10/2018 | Boyer | F16H 57/0412 |
| 10,113,510 B2* | 10/2018 | Saleh | F02M 21/0239 |
| 10,330,208 B2* | 6/2019 | Takamatsu | F16K 27/06 |
| 10,900,557 B2* | 1/2021 | Muhammad | F01M 5/005 |
| 2005/0217221 A1* | 10/2005 | Stickland | F04C 29/026 55/319 |
| 2007/0164249 A1 | 7/2007 | Willers et al. | |
| 2014/0109973 A1* | 4/2014 | Neumeister | F16K 51/02 137/1 |
| 2016/0153571 A1* | 6/2016 | Braga | F16K 11/22 137/556 |
| 2017/0060146 A1 | 3/2017 | Powers et al. | |

FOREIGN PATENT DOCUMENTS

CN 203757126 U 8/2014
CN 206723534 U 12/2017

OTHER PUBLICATIONS

International Search Report and Written Opinion for International Application No. PCT/CN2018/084747, dated Jun. 22, 2018.

* cited by examiner

THERMOSTATIC VALVE

This application is a national stage filing under 35 U.S.C. § 371 of International Patent Application Serial No. PCT/CN2018/084747, filed Apr. 27, 2018, which claims the priority to Chinese Patent Application No. 201720489650.6, titled "THERMOSTATIC VALVE", filed with the China National Intellectual Property Administration on May 4, 2017. The entire contents of these application are incorporated herein by reference in their entirety.

FIELD

The present application relates to the technical field of fluid control, and in particular to a thermostatic valve.

BACKGROUND

A vehicle is equipped with a thermostatic valve, and the thermostatic valve includes a connecting tube portion and a mounting base portion. The connecting tube portion is used for being in communication with a corresponding tube, and the mounting base portion is used for mounting the thermostatic valve to a vehicle body, to realize positioning.

Currently, the thermostatic valve is mainly manufactured through profile machining, but there is a certain difficulty in profile machining. For example, as for the connecting tube portion, a tube hole is required to be machined by cutting, although the tube hole can be machined by cutting to a certain extent, there are still some redundant materials cannot be removed due to the limitation of the process cost, the weight of the product cannot be reduced to a greater extent, resulting in a problem that the product cannot meet the lightweight demand of the valve body in the current processing mode.

In view of this, a technical problem to be addressed by those skilled in the art is to optimize the structure of the valve body of the thermostatic valve, so as to further realize the lightweighting of the valve body and save material and cost.

SUMMARY

In order to solve the technical problem, a thermostatic valve is provided according to the present application, including a valve body formed by die casting. The valve body includes a main valve body configured to form a valve cavity, and a plurality of connecting tube portions. Each of the connecting tube portions includes a straight tube section connected to the main valve body. The valve body further includes a mounting base portion, the mounting base portion is arranged to be adjacent to the connecting tube portion, and a reinforcing rib is provided between the adjacent straight tube section of the connecting tube portion and the mounting base portion.

The valve body in the technical solution is formed by die casting, the connecting tube portions, the mounting base portion and the main valve body are formed by die casting. For a valve body formed by die-casting, a mold can be designed according to the demands, and a desired structure can be formed by injecting the liquid metal raw material of the valve body into the mold, die casting and then demolding. Therefore, each portion of the valve body can be processed according to actual size requirements through die-casting, which can achieve the lightweight design of the valve body of the thermostatic valve, and the waste of the material is less. Moreover, compared with machining, portions difficult to be cut or cannot be cut by machining can also be removed with die casting, which saves production costs. The reinforcing ribs are provided to meet the strength requirements in a case that die casting is employed.

Figure 1:
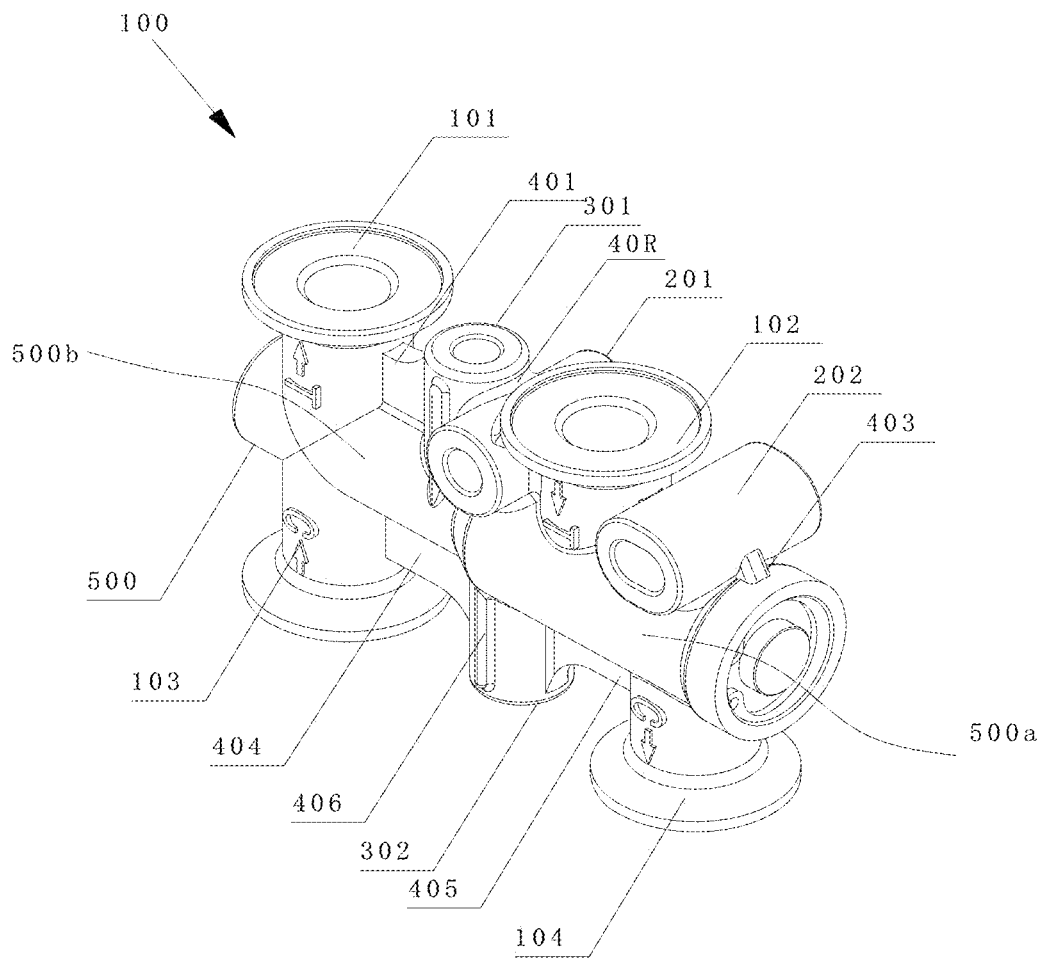
FIG. 1 is a schematic view showing the structure of a valve body of a thermostatic valve according to a specific embodiment of the present application.

Reference Numerals in FIGS. 1 to 5:

| 100 | valve body; | | |
|---|---|---|---|
| 101 | first connecting tube portion, | 102 | second connecting tube portion, |
| 103 | third connecting tube portion, | 104 | fourth connecting tube portion, |
| 10a | straight tube section, | 10b | conical section; |
| 201 | first mounting base portion, | 202 | second mounting base portion; |
| 301 | first fixing base portion, | 302 | second fixing base portion; |
| 401 | first connecting rib, | 402 | second connecting rib, |
| 403 | third connecting rib, | 404 | fourth connecting rib, |
| 405 | fifth connecting rib, | 406 | extending rib, |
| 40R | reinforcing rib with rounded corner; | | |
| 500 | main valve body, | 501 | plane, |
| 500 | first main valve body, | 500b | second main valve body. |

DETAILED DESCRIPTION OF EMBODIMENTS

For those skilled in the art to better understand technical solutions of the present application, the present application will be further described in detail in conjunction with drawings and embodiments hereinafter.

Figure 2:
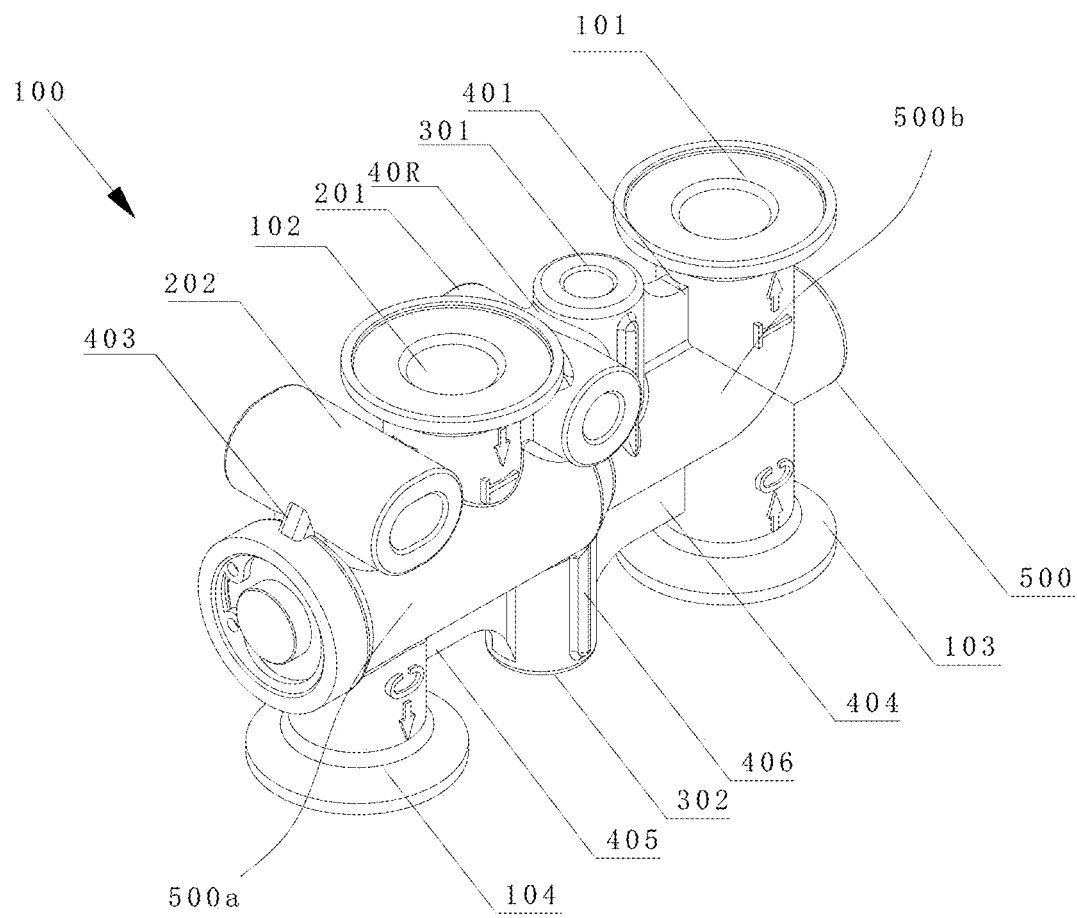
FIG. 2 is a schematic view of FIG. 1 from another perspective.
Figure 3:
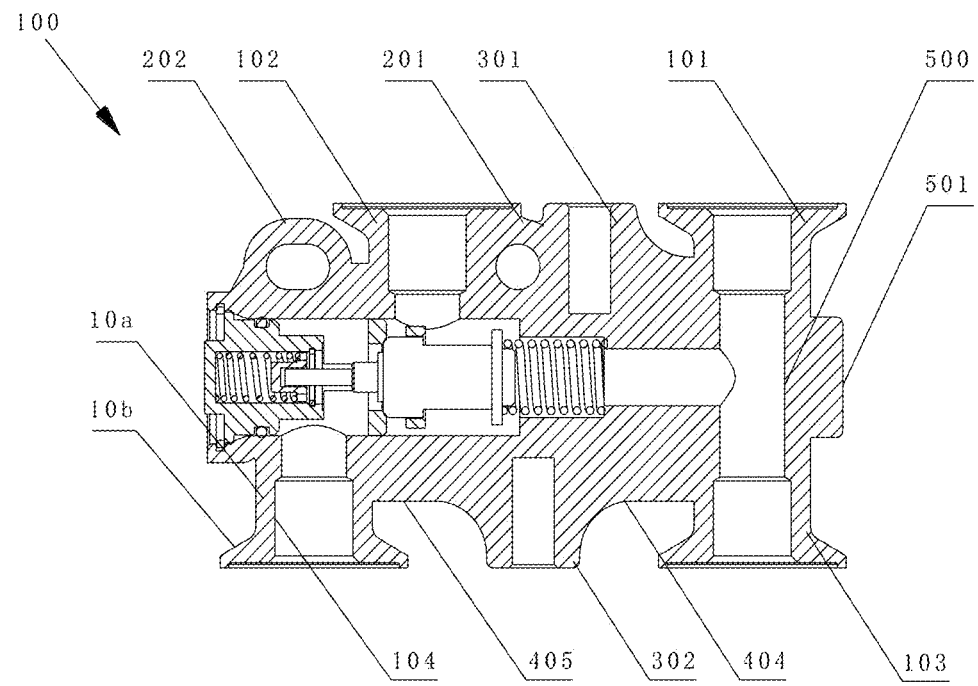
FIG. 3 is an axial sectional view of FIG. 1.

Referring to FIGS. 1 to 3, FIG. 1 is a schematic view showing the structure of a valve body of a thermostatic valve according to a specific embodiment of the present application; FIG. 2 is a schematic view of FIG. 1 from another perspective; and FIG. 3 is an axial sectional view of FIG. 1.

A valve body 100 of a thermostatic valve is provided according to the specific embodiment. As shown in FIG. 1, the valve body 100 includes a main valve body 500 configured to form a valve cavity, and a plurality of connecting tube portions in communication with the main valve body 500. Four connecting tube portions are shown in FIG. 1, namely, a first connecting tube portion 101, a second connecting tube portion 102, a third connecting tube portion 103 and a fourth connecting tube portion 104, which are configured to be in communication with corresponding tubes, respectively. The valve cavity of the main valve body 500 is configured for mounting components such as a valve core and the like. The main valve body 500 includes a first main valve body 500a and a second main valve body 500b. In FIG. 1, the first main valve body 500a is located at a right side and the second main valve body 500b is located at a left side. An outer diameter of the first main valve body 500a is greater than that of the second main valve body 500b, which facilitates demolding.

The thermostatic valve according to the specific embodiment can be installed in a vehicle, so the valve body 100 of the thermostatic valve is further provided with a mounting base portion configured to be in communication with a vehicle body. The mounting base portion specifically includes the mounting base portion configured to be connected to the vehicle body and a gearbox fixing base portion configured to be connected to a gearbox system in the vehicle as shown in the figure. The gearbox fixing base portion and the mounting base portion are both arranged at the main valve body 500, or the gearbox fixing base portion and the mounting base portion are part of the main valve body 500.

The valve body 100 in this embodiment is integrally formed by die casting, that is, the structure shown in FIG. 1 is an integral structure, and the connecting tube portions, the mounting base portion and the fixing base portion can be integrally formed with the main valve body 500 by die casting. For the valve body 100 formed by die-casting, a mold can be designed according to the demands, and a desired structure can be formed after injecting a liquid metal raw material of the valve body 100 into the mold, die-casting and then demolding. Therefore, each portion of the valve body 100 can be processed according to actual size requirements through die-casting, which can improve an utilization rate of the material, realize a lightweight design of the valve body 100 of the thermostatic valve, decrease material waste, reduce a processing amount of cutting and save production costs. During die-casting, an aluminum material may be employed, to further realize lightweighting.

As shown in FIG. 3, specific structures of the connecting tube portions are optimized according to this embodiment. Each of the connecting tube portions includes a straight tube section 10*a* in communication with the main valve body 500 and a conical section 10*b* connected to the straight tube section 10*a*, the conical section 10*b* forms a tube opening of the connecting tube portion, and the straight tube section 10*a* is connected to a side wall of the main valve body 500. Herein, the connecting tube portion is described as two sections, namely, the conical section 10*b* and the straight tube section 10*a* to facilitate illustration of the structure. In fact, as described above, since the connecting tube portion is integrally formed by die-casting, the conical section 10*b* and the straight tube section 10*a* are of an integrated structure, and there is no physical boundary.

Herein, a position of the tube opening of the connecting tube portion is designed to have the conical section 10*b*, such that the connecting tube portion is expanded to a certain extent at the position of the tube opening, which is convenient for the connecting tube portion to be in communication with another corresponding tube or tube opening, so that a medium can flow into or out of the thermostatic valve smoothly, thereby satisfying the requirements of reliable and rapid installation, and materials can also be saved (in a case that the tube is relatively large, an outer diameter of a main body of the connecting tube portion may be small). Of course, in order to enable the tube opening to be expanded, it is more conventional to cut or squeeze directly inside the straight cylindrical connecting tube portion to form a flare, while according to this technical solution, the connecting tube portion is designed to include the straight tube section 10*a* and the conical section 10*b*, so that a wall thickness of the whole connecting tube portion is relatively uniform. As shown in FIG. 3, a wall thickness of the straight tube section 10*a* is substantially the same as that of the conical section 10*b*, so that in a die-casting process, die-casting performance can be improved and generation of bubbles can be reduced. That is, integral formation by the die casting is realized, performance of a connecting position of the connecting tube portion is good, and bubbles can be reduced, and thereby airtightness of the valve body 100 is ensured.

With continued reference to FIG. 1, as described above, in order to mount the thermostatic valve, the main valve body 500 is further provided with a mounting base portion for mounting the thermostatic valve to the vehicle body, and a fixing base portion fixed to the gearbox. During die-casting, a reinforcing rib for reinforcing the mounting base portion and/or the connecting tube portion is further formed by integral die-casting of the main valve body 500.

Specifically, in this embodiment, two connecting tube portions are arranged at one side of the main valve body 500, namely, the first connecting tube portion 101 and the second connecting tube portion 102. Viewed from the perspective of FIG. 1, that is, an upper side of the main valve body 500 is provided with the two connecting tube portions; and a lower side of the main valve body 500 is also provided with two connecting tube portions, namely, the third connecting tube portion 103 and the fourth connecting tube portion 104.

The mounting base portion specifically includes a first mounting base portion 201 and a second mounting base portion 202. The fixing base portion connected to the gearbox specifically includes a first fixing base portion 301 and a second fixing base portion 302. As shown in FIG. 1, both the two mounting base portions are located at the upper side of the main valve body 500, the two mounting base portions are located at two sides of the second connecting tube portion 102, and are horizontally arranged, and an axis of each of the mounting base portions is substantially vertical to an axis of the connecting tube portion. In this embodiment, the mounting base portion, the fixing base portion and the main valve body 500 (including the first main valve body 500*a* and the second main valve body 500*b*) are each has a cylindrical shape or a substantially cylindrical shape, which saves the material.

The material around the connecting tube portions, the mounting base portion and the fixing base portion can be removed, however, since the machining is very difficult and even cannot be performed, the above material is not removed in the conventional technology. With the arrangement in this embodiment, die-casting is employed, and stability of the connecting tube portions, the mounting base portion and the fixing base portion is improved through the reinforcing rib, the processing is simple and the material is saved.

As shown in FIGS. 1 to 3, the first mounting base portion 201 has a circular mounting through-hole, and the second mounting base portion 202 has an oblong mounting through-hole, a major axis of an oblong shape extends in parallel. During installation, studs are generally inserted into the mounting through-holes to be connected to the vehicle body. In a case that mounting through-holes are provided, two studs can be inserted to improve reliability of the installation. Of course, the number of the mounting base portion is not limited to two in theory, in view of a volume and installation efficiency of the thermostatic valve, on the premise that requirements for fixing are satisfied, it is convenient for processing and installation by providing two mounting base portions. The principle of providing the gearbox mounting base portion is the same, and will not be described in detail. Herein, center lines of the mounting through-holes of the first mounting base portion 201 and the second mounting base portion 202 are located in a same horizontal plane. One of the above mounting through-holes is arranged to be an oblong hole, which provides a certain amount of installation allowance, to avoid affection of an assembly error, and improve the installation efficiency. A length of the oblong hole is in a horizontal direction.

The fixing base portion fixed to the gearbox includes the first fixing base portion 301 and the second fixing base portion 302. As shown in FIGS. 1 to 3, the two fixing base portions are arranged at the upper and lower sides of the main valve body 500, respectively. The two fixing base portions are each provided with a threaded hole, in a case that the fixing base portions are mounted to the gearbox system, threaded connections are realized by studs, and an opening of the threaded hole faces a same direction as that of the connecting tube portion.

The first mounting base portion 201 and the first fixing base portion 301 are arranged between the first connecting tube portion 101 and the second connecting tube portion 102. In this case, the reinforcing rib includes reinforcing ribs with rounded corner 40R formed between the first mounting base portion 201 and the first fixing base portion 301, and between the first mounting base portion 201 and the second connecting tube portion 102.

Figure 4:
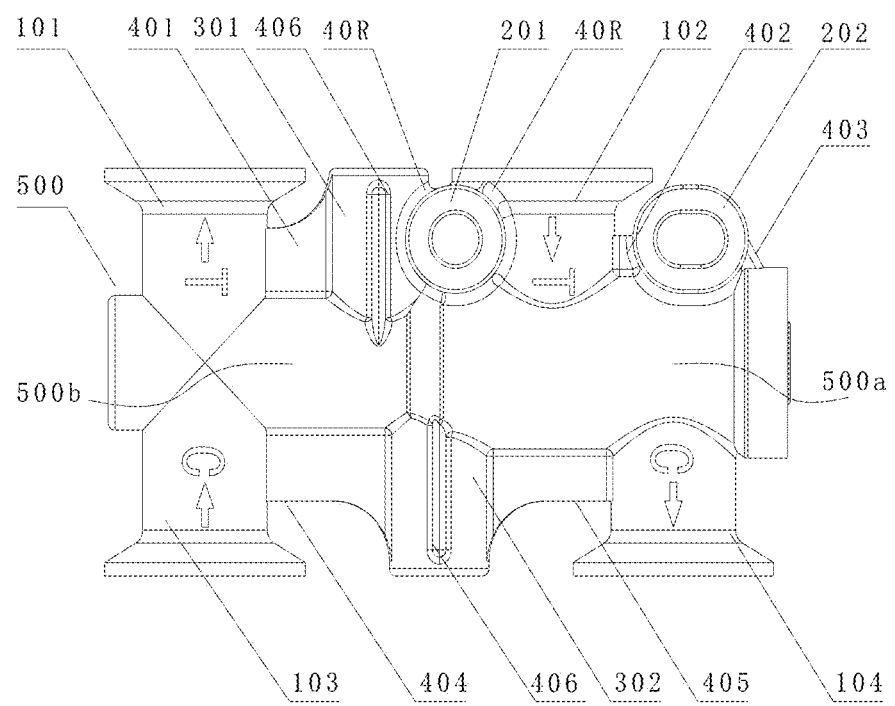
FIG. 4 is a front view of FIG. 1.
Figure 5:
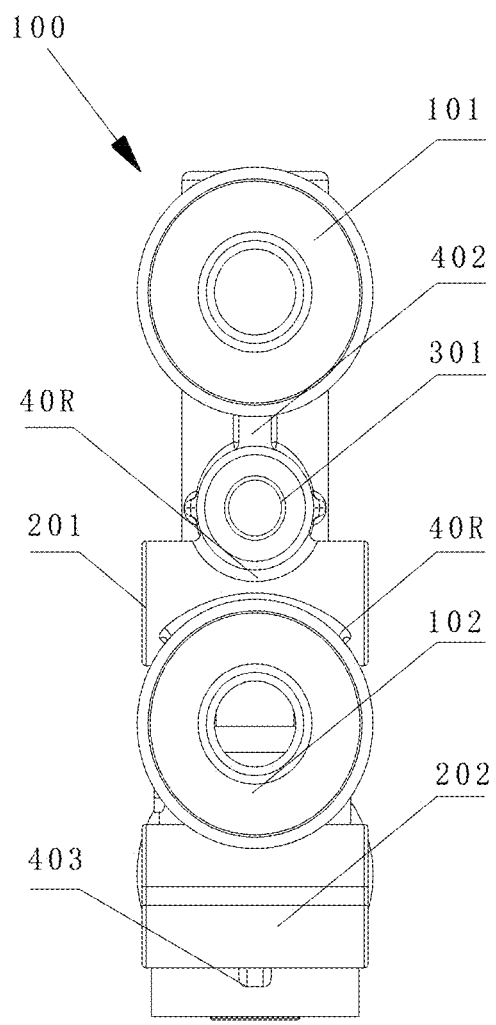
FIG. 5 is a top view of FIG. 4.

Referring to FIGS. 4 to 5, FIG. 4 is a front view of FIG. 1, and FIG. 5 is a top view of FIG. 4.

The first mounting base portion 201 is located between the first fixing base portion 301 and the second connecting tube portion 102. In this embodiment, the first mounting base portion 201 comes into contact with, or intersects with, or is close to the first fixing base portion 301 and the straight tube section 10a of the second connecting tube portion 102, the reinforcing ribs are formed after die-casting at positions where the above portions are in contact, intersect or close to each other, that is, the reinforcing ribs with rounded corner 40R in the figure.

Compared with a conventional solution of reinforcing ribs for connection, with the reinforcing ribs with rounded corner 40R, the first mounting base portion 201, the first fixing base portion 301 and the second connecting tube portion 102 can be connected more closely, moreover, the die-casting performance can be improved, such that the liquid die-casting material may flow better, which reduces the generation of the bubbles, and thereby ensuring the airtightness of the thermostatic valve.

The reinforcing rib further includes a first connecting rib 401, as shown in FIG. 4, two ends of the first connecting rib 401 are connected to the first fixing base portion 301 and the first connecting tube portion 101, and a bottom of the first connecting rib 401 is connected to the main valve body 500. There is still a certain distance between the first fixing base portion 301 and the first connecting tube portion 101 in space, in this case, the first connecting rib 401 is provided to strengthen the connection and improve the strength, so as to satisfy the strength requirements under the premise of die casting.

As shown in FIG. 4, the mounting base portion further includes the second mounting base portion 202 for connecting the vehicle body, the second mounting base portion 202 is arranged at an outer side of the second connecting tube portion 102. The outer side is defined with respect to the first connecting tube portion 101, an inner side is a side close to the first connecting tube portion 101, and the outer side is a side away from the first connecting tube portion 101. After the second mounting base portion 202 is arranged, the reinforcing rib correspondingly includes a second connecting rib 402 and a third connecting rib 403. Two ends of the second connecting rib 402 are connected to the second mounting base portion 202 and the second connecting tube portion 102, respectively, and a bottom of the second connecting rib 402 is connected to the main valve body 500. The third connecting rib 403 is only connected to the main valve body 500 and the second mounting base portion 202, and a section of the third connecting rib 403 in the figure is substantially triangular and has a streamlined outer edge. Similarly, the second connecting rib 402 and the third connecting rib 403 can enhance the strength, and ensure the connection strength and structural reliability between the second mounting base portion 202 and the main valve body 500.

As shown in FIGS. 3 and 4, the lower side of the main valve body 500 is provided with two connecting tube portions, namely, the third connecting tube portion 103 and the fourth connecting tube portion 104, and the second fixing base portion 302 configured to be connected to the gearbox system is arranged between the third connecting tube portion 103 and the fourth connecting tube portion 104.

In this case, the reinforcing rib further includes a fourth connecting rib 404 and a fifth connecting rib 405, the fourth connecting rib 404 is connected to the third connecting tube portion 103, the main valve body 500 and the second fixing base portion 302, and the fifth connecting rib 405 is connected to the fourth connecting tube portion 104, the main valve body 500 and the second fixing base portion 302. As shown in FIG. 3, two ends of each of the fourth connecting rib 404 and the fifth connecting rib 405 are connected to the connecting tube portions and the second fixing base portion 302, and a top portion of each of the fourth connecting rib 404 and the fifth connecting rib 405 is connected to the main valve body 500.

It can be seen from the figures that, the connecting rib has a streamlined outer edge after die-casting. In FIG. 3, a joint between the connecting rib and the corresponding mounting base portion has an arc-shaped transition, which can reduce stress concentration at a position of the connecting rib after processing, and obtain a good shape. The fourth connecting rib 404 and the fifth connecting rib 405 provided herein can improve the connection reliability between the connecting tube portions and the second fixing base portion 302.

Preferably, as shown in FIGS. 1 to 5, the first fixing base portion 301 and the second fixing base portion 302 are each provided with an extending rib 406 extending in a length direction thereof, the extending rib 406 is arranged at a periphery of the corresponding fixing base portion, and the extending rib 406 is connected to the main valve body 500. From a perspective of FIG. 4, the gearbox fixing base portion is arranged vertically (the mounting base portion is arranged horizontally), which is consistent with an extending direction of the connecting tube portions. The arrangement of the extending rib 406 can improve the strength of the second fixing base portion 302, and ensure the reliability after the threaded connection. It can be seen from FIGS. 1 and 2, two sides of the gearbox mounting base portion are provided with the extending ribs 406.

For the above embodiment, as shown in FIGS. 3 and 4, one end of the main valve body 500 is a plane 501, and in a case that the main valve body 500 is erected to allow the an axial direction of the main valve body 500 to be vertical, the plane 501 is a supporting surface. The thermostatic valve shown in the figures is in a horizontal state. From the perspective of FIG. 4, in a case that the valve body 100 of the thermostatic valve is rotated counterclockwise by 90 degrees to be erected, the plane 501 at a left end of the main valve body 500 is the supporting surface, to allow the whole valve body 100 of the thermostatic valve to be supported steadily, so that a stable state can be maintained during assembly, and damages caused by collision can be reduced.

In the above embodiments, the arrangement of various reinforcing ribs (the connecting ribs, extending ribs and reinforcing ribs with rounded corner) enhances the overall strength, improves the die-casting performance, and thus the valve body 100 formed by die-casting has a stable structure and good performance.

The embodiments described hereinabove are only preferred embodiments of the present application, and it should be noted that, for those skilled in the art, a few of modifications and improvements may be made to the present application without departing from the principle of the present application, and these modifications and improvements are also deemed to fall into the scope of the present application defined by the claims.

The invention claimed is:

1. A thermostatic valve, comprising a valve body, wherein the valve body is formed by die casting; the valve body comprises a main valve body configured to form a valve cavity, and a plurality of connecting tube portions, each of the connecting tube portions comprises a straight tube section connected to the main valve body; the valve body further comprises a mounting base portion, the mounting base portion is arranged to be adjacent to one of the connecting tube portions, and a plurality of reinforcing ribs;
one side of the main valve body is provided with a first connecting tube portion and a second connecting tube portion of the plurality of connecting tube portions;
the mounting base portion comprises a first mounting base portion and a second mounting base portion, the first mounting base portion and the second mounting base portion are respectively located at two sides of the second connecting tube portion, and a first reinforcing rib of the plurality of ribs is provided between the second connecting tube portion and the first mounting base portion, and a second reinforcing rib of the plurality of reinforcing ribs is provided between the second connecting tube portion and the second mounting base portion;
another side of the main valve body opposite to the side of the main valve body is also provided with a third connecting tube portion and a fourth connecting tube portion of the plurality of connecting tube portions;
the valve body further comprises a first fixing base portion and a second fixing base portion, the first fixing base portion is arranged between the first connecting tube portion and the first mounting base portion, and the second fixing base portion is arranged between the third connecting tube portion and the fourth connecting tube portion; and
an opening of the first fixing base portion, an opening of the first connecting tube portion, and an opening of the second connecting tube portion face a same direction; an opening of the second fixing base portion, an opening of the third connecting tube portion, and an opening of the fourth connecting tube portion face a same direction.

2. The thermostatic valve according to claim 1, wherein each of the connecting tube portions comprises the straight tube section in communication with the main valve body and a conical section connected to the straight tube section, and the conical section is configured to form a tube opening of the connecting tube portion.

3. The thermostatic valve according to claim 2, wherein one end of the main valve body is a plane, and in a case that the main valve body is erected to allow an axial direction thereof to be vertical, the plane is a supporting surface.

4. The thermostatic valve according to claim 2, wherein the main valve body comprises a first main valve body and a second main valve body each having a cylindrical shape, and an outer diameter of the first main valve body is greater than an outer diameter of the second main valve body; and each of the connecting tube portions also has a cylindrical shape.

5. The thermostatic valve according to claim 1, wherein the plurality of reinforcing ribs further comprises a first connecting rib, a plurality of reinforcing ribs with rounded corner, a third connecting rib, a fourth connecting rib and a fifth connecting rib; and
the first connecting rib is provided between the first connecting tube portion and the first fixing base portion, one of the plurality of reinforcing ribs with rounded corner is provided between the first fixing base portion and the first mounting base portion, the first reinforcing rib comprises a rounded corner the third connecting rib is provided between the second mounting base portion and the main valve body, the fourth connecting rib is provided between the third connecting tube portion and the second fixing base portion, and the fifth connecting rib is provided between the fourth connecting tube portion and the second fixing base portion.

6. The thermostatic valve according to claim 5, wherein bottoms of the first connecting rib, the second reinforcing rib, the third connecting rib, the fourth connecting rib and the fifth connecting rib are connected to the main valve body.

7. The thermostatic valve according to claim 6, wherein the first fixing base portion and the second fixing base portion are each provided with an extending rib extending in a length direction thereof, and the extending rib is connected to the main valve body; one of the first mounting base portion and the second mounting base portion has a circular mounting through-hole, the other has an oblong mounting through-hole.

8. The thermostatic valve according to claim 7, wherein the main valve body comprises a first main valve body and a second main valve body each having a cylindrical shape, and an outer diameter of the first main valve body is greater than an outer diameter of the second main valve body; each of the connecting tube portions also has a cylindrical shape; the first mounting base portion, the second mounting base portion, the first fixing base portion and the second fixing base portion each has a cylindrical shape; and the first main valve body, the second main valve body, the connecting tube portions, the first mounting base portion, the second mounting base portion, the first fixing base portion and the second fixing base portion are integrally formed by die casting.

9. The thermostatic valve according to claim 6, wherein the main valve body comprises a first main valve body and a second main valve body each having a cylindrical shape, and an outer diameter of the first main valve body is greater than an outer diameter of the second main valve body; each of the connecting tube portions also has a cylindrical shape; the first mounting base portion, the second mounting base portion, the first fixing base portion and the second fixing base portion each has a cylindrical shape; and the first main valve body, the second main valve body, the connecting tube portions, the first mounting base portion, the second mounting base portion, the first fixing base portion and the second fixing base portion are integrally formed by die casting.

10. The thermostatic valve according to claim 5, wherein the main valve body comprises a first main valve body and a second main valve body each having a cylindrical shape, and an outer diameter of the first main valve body is greater than an outer diameter of the second main valve body; and each of the connecting tube portions also has a cylindrical shape.

11. The thermostatic valve according to claim 5, wherein the main valve body comprises a first main valve body and a second main valve body each having a cylindrical shape, and an outer diameter of the first main valve body is greater than an outer diameter of the second main valve body; each of the connecting tube portions also has a cylindrical shape; the first mounting base portion, the second mounting base portion, the first fixing base portion and the second fixing base portion each has a cylindrical shape; and the first main valve body, the second main valve body, the connecting tube portions, the first mounting base portion, the second mounting base portion, the first fixing base portion and the second fixing base portion are integrally formed by die casting.

12. The thermostatic valve according to claim 1, wherein one end of the main valve body is a plane, and in a case that the main valve body is erected to allow an axial direction thereof to be vertical, the plane is a supporting surface.

13. The thermostatic valve according to claim 1, wherein the main valve body comprises a first main valve body and a second main valve body each having a cylindrical shape, and an outer diameter of the first main valve body is greater than an outer diameter of the second main valve body; and each of the connecting tube portions also has a cylindrical shape.

14. The thermostatic valve according to claim 1, wherein the main valve body comprises a first main valve body and a second main valve body each having a cylindrical shape, and an outer diameter of the first main valve body is greater than an outer diameter of the second main valve body; each of the connecting tube portions also has a cylindrical shape; the first mounting base portion, the second mounting base portion, the first fixing base portion and the second fixing base portion each has a cylindrical shape; and the first main valve body, the second main valve body, the connecting tube portions, the first mounting base portion, the second mounting base portion, the first fixing base portion and the second fixing base portion are integrally formed by die casting.

* * * * *